(12) United States Patent
Larose et al.

(10) Patent No.: US 12,240,120 B2
(45) Date of Patent: Mar. 4, 2025

(54) METHOD OF OPERATING ONE OR MORE ROBOTS

(71) Applicant: Carnegie Robotics, LLC, Pittsburgh, PA (US)

(72) Inventors: David Larose, Pittsburgh, PA (US); Claus Thybo, Pittsburgh, PA (US)

(73) Assignee: CARNEGIE ROBOTICS, LLC, Pittsburgh, PA (US)

( * ) Notice: Subject to any disclaimer, the term of this patent is extended or adjusted under 35 U.S.C. 154(b) by 252 days.

(21) Appl. No.: 17/726,941

(22) Filed: Apr. 22, 2022

(65) Prior Publication Data

US 2022/0339785 A1 Oct. 27, 2022

Related U.S. Application Data

(60) Provisional application No. 63/178,760, filed on Apr. 23, 2021.

(30) Foreign Application Priority Data

Jul. 1, 2021 (EP) .................................... 21183045

(51) Int. Cl.
 *B25J 9/16* (2006.01)
 *B25J 11/00* (2006.01)

(52) U.S. Cl.
 CPC ............. *B25J 9/1661* (2013.01); *B25J 9/162* (2013.01); *B25J 9/1653* (2013.01); *B25J 9/1679* (2013.01); *B25J 11/0085* (2013.01)

(58) Field of Classification Search
 CPC ........ B25J 9/1661; B25J 9/162; B25J 9/1653; B25J 9/1679; B25J 11/0085; B25J 5/007; B25J 9/0003; B25J 9/1628; B25J 9/163; B25J 9/1656; B25J 11/0045; B25J 11/008; G06Q 10/06312; G06Q 10/0633; G06Q 10/06316; G05D 1/021; G05D 1/0217; G05B 2219/23287; G05B 2219/25387; G05B 2219/32254; G05B 2219/32291; G05B 2219/34418; G05B 2219/36301; G05B 2219/31449; G05B 2219/32008; G05B 2219/32277; G05B 2219/40108

See application file for complete search history.

(56) References Cited

U.S. PATENT DOCUMENTS 9,612,727 B2 * 4/2017 Saito .................... G06F 3/0484
2016/0334800 A1 * 11/2016 Han .................... A47L 11/4011
(Continued)

FOREIGN PATENT DOCUMENTS

CN 109426560 A 3/2019
DE 102015121666 B3 5/2017
(Continued)

OTHER PUBLICATIONS

Extended European Search Report from Corresponding European Application No. EP21183045.0, Nov. 29, 2021.

*Primary Examiner* — Abby Y Lin
*Assistant Examiner* — Esvinder Singh
(74) *Attorney, Agent, or Firm* — Workman Nydegger

(57) ABSTRACT

A method of operating a robot performing a task when receiving instructions to discontinue the task and perform an additional task. Having performed the additional task, the robot will revert to the position of performing the first task and continue the first task.

14 Claims, 1 Drawing Sheet

(56) References Cited

U.S. PATENT DOCUMENTS

| | | | |
|---|---|---|---|
| 2018/0292827 A1 | 10/2018 | Artes et al. | |
| 2019/0163184 A1* | 5/2019 | Zhang | G05D 1/0088 |
| 2020/0319640 A1* | 10/2020 | Vogel | A47L 9/2852 |
| 2021/0373558 A1* | 12/2021 | Schneider | G01C 21/206 |
| 2022/0129000 A1* | 4/2022 | Ingvalson | G05D 1/0214 |

FOREIGN PATENT DOCUMENTS

| | | |
|---|---|---|
| WO | 2018013538 A1 | 1/2018 |
| WO | 2018051349 A1 | 3/2018 |

* cited by examiner

METHOD OF OPERATING ONE OR MORE ROBOTS

BACKGROUND

The present invention relates to a method of operating one or more robots and in particular a method in which a robot may be interrupted in the performing of a task, directed to perform another task and then revert to the first task. The tasks are performed in different portions of an area or scene in which the robot operates.

A first aspect of the invention relates to a method of operating one or more robots in an area or venue, the method comprising:
- providing a service schedule representing a plurality of tasks, comprising a first task, and, for each task, one or more parameters,
- a first robot performing the first task,
- an operator engaging a user interface of the robot,
- the first robot discontinuing the first task and performing an additional task while the operator operates the user interface,
- after step d), determining, based on the parameters of any remaining tasks, an order of the remaining tasks and performing the remaining tasks in the determined order.

SUMMARY

In the present context, a robot preferably is a self-propelled unit, which may move about in the area or scene and which may perform one or more tasks in the area or scene. The robot may comprise one or more elements for facilitating movement, such as wheels, belts, rollers, propellers, wings, fins or the like. The robot may be self-navigating in the sense that it comprises one or more sensors for sensing obstacles or the like, so that the robot may be able to avoid obstacles and move from one position to another without engaging or bumping into such obstacles. The robot may comprise a controller/processor for receiving sensor output so as to determine a position of the robot in the scene, venue or area and potentially positions of obstacles and for determining a route in the scene, venue or area. The controller/processor may further control an operation of the robot, such as the carrying out of a task of the robot.

The robot may be autonomous to the degree where the robot is able to react to unexpected situations, such as its path being blocked by luggage. The robot may realize this and move around the luggage to perform its task.

In this context, a task may be one or more of many types of tasks. A task may be a treatment of a surface, a cleansing of a surface, inspection of a surface, a transport of goods from one position to another, a guiding of a person from one position to another, for example. Other tasks may be monitoring/surveillance or inventory assessment, such as to determine positions of obstacles, dirty surfaces or the like, A surface treatment may be a disinfection, painting/lacquering/sanding for example. A surface cleaning may be vacuuming, floor/surface mopping or the like. A transporting task may be bringing out fast food, hauling luggage, goods, products, mail or parcels, for example. Additional types of tasks may relate to maintenance, building structures, tidying up, weeding or the like, such as outside, such as in the fields where a robot may be weeding by identifying weeds and spraying/irradiating these. A task may then be the weeding of a field.

Tasks may be performed within a limited area or a portion of an area, such as within a building or a part of a building. Cleaning operations, for example, usually will relate to a building, portions of a building, predetermined rooms, predetermined surfaces, predetermined surface types or the like.

Transporting may be within the building, such as bringing snacks from a bar to a room in a hotel, but may be within larger areas, such as bringing out fast food in a town or city. Transporting tasks may relate to the transport of any type of products, goods or the like in any environment, such as restocking shelves in a supermarket/storage rooms in hotels/hospitals, delivering goods or products within an overall structure (to shops in an airport) or to individual consumers (fast food, groceries, mail, parcels). A task thus may be performed within a predetermined portion of the area or venue.

Robots may be configured to themselves interrupt a task, if for example power or a consumable, such as cleaning fluid, waste space or the like is running out. Then, the robot may revert to a replenishment or make-up station to get recharged, emptied or replenished. After that, the robot may of its own motion revert to the interrupted task.

The present invention relates to a situation where the robot receives instructions from the user interface causing it to interrupt the first task and perform a task instructed via the user interface. The interface is operated by an operator which via the interface controls the robot. As will be described below, the robot may comprise the user interface, such as in the form of controls which may be operated to control the operation of the robot as well as the manoeuvring thereof. Alternatively, the robot may be controllable more remotely but still via an operator controlling the operation of the robot. The robot may, when receiving the instructions, be fully capable of, at that time, complete the first task. For example, the robot may have time and comprise all consumables required to complete the first task.

The additional task which the robot is controlled to do may be completely independent from the first task. For example, the first and additional tasks may have no overlap. The first task may relate to one type of task, such as floor cleaning, where the additional task may relate to another type of task, such as tabletop cleaning/disinfecting or a transport task. In the latter situation, the first and second portions may overlap, as the tasks of the robot will be different. The first and second portions may have no overlap. Thus, the robot may need to move to go from the first portion to the second portion. In this connection may be an overlap in the areas which the robot is required to move in/over to complete the first task and the additional task. In one situation, no portion of a floor is common to the first and second portions.

As will be described below, a task be performed in accordance with one or more parameters.

When the robot discontinues the first task, the robot may log a stage or state of the first task, such as a position within the first portion of the area at which the task was discontinued. Alternatively, or additionally, the robot may log in which parts of the first portion the first task has been performed and/or in which parts of the first portion the first task has not been performed. Such information may assist the robot in resuming the first task.

The robot may receive the information from the user interface in a number of manners. Often, the robot is in wireless connection with a remote controller. Naturally, the connection may take place over wires, but this may limit the operational range of the robot. The remote controller may comprise an interface for an operator to control the robot in real time, such as for guiding the robot to manoeuvre the robot to a desired area or position. The user interface may also comprise controls for controlling an operation of the robot, such as a cleaning function, hauling function, disinfecting function or the like. Also, the user interface may be used more generally for entering tasks, such as the additional task and the below-mentioned service schedule, as well as any desired parameters of tasks, such as periods of time within which the individual tasks may not be performed, periods of time in which the task must be completed or are desired completed, maximum or minimum amounts of a consumable or consumable resource, such as cleaning fluid, power, waste space or the like, which the robot may consume performing a task, or the like. The robot may report to the remote controller which task(s) is/are completed and/or a state or stage or a present task. The robot may additionally or alternatively report a state or amount of one or more consumables or consumable resources. The usefulness of this information is described further below.

The information received from the user interface may relate to the robot being instructed to move to or across an area and to perform a task or operation at the same time or subsequently. The input from the operator may direct the robot and instruct the robot to move, turn, accelerate, decelerate and the like and/or to operate other functions of the robot, such as a cleaning function, disinfection function or the like.

Naturally, the robot or controller may calculate a cost function or an expression of effort of the performing of the additional task, such as an increased period of time until the first task is completed, an increased consumption of power or other consumables. The operator may be required to enter an acceptance before the information is transmitted to the robot.

Naturally, also other reasons may exist for discontinuing the first task, such as in situations where it is not desirable or feasible for the robot to perform the task. For example, if the occupancy of a room exceeds a threshold number of people, it may be desired to not have the robot operate in the room. Thus, if the first task is to be performed in the room, the robot may be informed of the occupancy or the fact that the room is not to be operated in, whereby the robot will discontinue the task and move to the additional task. The robot may revert to the first portion, such as when the occupancy has dropped to below the threshold. The occupancy limit may vary. If the task is a UV disinfecting of surfaces, it may be desired for safety purposes that the first portion be free of any persons, whereas a cleaning or transporting task may accept quite a few persons in the first portion.

In another example, it may be realized that a path of the robot may be blocked, so that the robot cannot reach part of the first portion or cannot reach a destination of a transport task. Thus, the robot may discontinue this task and move to another task.

In another situation, it may be estimated that the first portion will soon be even dirtier, such as if bad weather is expected imminently and the first portion is a lobby, or if a number of persons with furred pets are expected to pass. In that situation, cleaning the first portion at this time will be a waste of time and consumables, so the task may be discontinued to be reverted to later on, such as when the bad weather or pets has/have passed.

In such situations, the robot may receive information relating to the first portion stemming from one or more sensors in the first portion, such as forming part of the robot or forming part of the first portion, such as a camera, a $CO_2$ sensor, a PIR sensor or the like. The information may relate to a number of persons in the first portion or a percentage or fraction of the first portion which is not accessible or of the first task which cannot be performed. Alternatively, that information may stem from outside of the robot and first/second portions, such as weather information, traffic information or the like. Traffic information may be interpreted into an expected occupancy of the first portion and thus to a decision of whether to interrupt the first task or not.

In such situations, the present system may be connected to another system of the building or venue, such as a booking system. If a room-booking system indicates that a larger number of bookings is made, a larger number of people may be expected in the reception area. A meeting room may be booked or unbooked, so that room may become unavailable for access or may become available for access. Some ventilation systems are controlled based on indoor climate parameters, such as $CO_2$. Thus, if a room is occupied by a large number of people, the $CO_2$ in that room may be kept at a low level by the ventilation. Accessing data from the ventilation system thus may give an indication of the occupancy of that room.

A service schedule identifies a plurality of tasks. The identification may be a simple reference to a description of the task, which may be in the robot or elsewhere. A task may be defined very precisely, such as exactly which surface or portion of a surface to clean/treat and how or to which degree this cleaning/treatment is to be performed. In other situations, the task may be less strictly defined, such as bring parcel X from position A to position B, where the robot may itself decide how to get from position A to position B.

In many situations, a service provider and a client will make an agreement, often called a Service Level Agreement, specifying the service and parameters of that service. The SLA will define the service to a certain degree so that the parties may see whether the service is delivered in accordance with the agreement so that the service provider may be remunerated in accordance with the SLA.

More precisely, the SLA or service schedule define a number of tasks to be performed and any further parameters thereof, such as a frequency of cleaning of a surface, a degree or quality of the cleaning of the surface, a time interval within which the surface should be cleaned, the maximum or minimum amount of time allowed for transporting a product, or the like. The service may be adapted to other parameters, such as other use of the surfaces or areas/paths in which the robot is to perform tasks. In some situations, cleaning is not desired within a period of time in which the surface is used by others. In hotels, cleaning of the lobby is not desired in peak hours and cleaning of rooms is not desired during the night. In airports, floor mopping may be desired at night or outside of peak hours, and for transport, some paths, roads or areas may be avoided during periods during which these are busy with other traffic.

Thus, for a task, a period of time may be agreed on during which the task must be performed, or a bonus system may be set up so that if the task is performed within the period of time, a larger bonus is awarded than if the task is performed or completed outside of the period of time.

Additional or alternative parameters may be defined for a task to fulfil or for the task to be completed. An expenditure of a consumable, such as power, cleaning fluid or the like may be tracked and compared to an allowed amount. Also, or alternatively, a quality of a cleaning operation may be defined. If the task is not performed to that quality, the task may not be seen as completed, or a lower bonus may be awarded.

The service schedule may represent all or some of the tasks of an SLA. For each task, a description thereof may exist (e.g., vacuum floor in lobby), as may a period of time within which it should be performed or not be performed, or a maximum or minimum period of time which the task may take. Also, or alternatively, a quality of the performance of the task may be provided.

The robot may, when for example sensing that continuing the first task is not viable or desirable, output information for a controller or operator to understand this. This information may merely be information indicating that the first task should be discontinued, leaving it to the operator to decide what to do, such as identify the additional task. The robot may alternatively output information to the operator identifying one or more solutions to the problem, such as one or more additional tasks, such as derived from a service schedule of the robot, which could be performed next. Alternatively, to a list of single tasks, the robot may revert with a list of potential task lists or sequences of tasks to perform after discontinuing the first task. The operator may then feed, to the robot, the information relating to one of the lists of tasks or one of the list of sequences of tasks.

According to the invention, step f) comprises, after step d) or e), determining, based on the parameters of any remaining tasks, an order of the remaining tasks. This order may be determined in a number of manners. In one manner, the order is determined so that as many as possible of the tasks are performed or completed within the parameter(s) thereof.

Finally, step g) comprises the robot performing the remaining tasks in the determined order. Naturally, this step may comprise a new interruption or kidnapping or another interruption of a task as described above and below, whereby this step is altered by performing additional tasks, new re-ordering of the then remaining tasks and so on.

In one embodiment, step e) comprises determining the order comprising also a remainder of the first task. Thus, the robot may decide to rearrange the order in which it performs the outstanding tasks being the remaining tasks and the remainder of the first task.

The order of the tasks may be decided so that as many tasks as possible may be performed within the required parameters.

In one situation, some tasks have a higher priority than other tasks, where the order is selected so that in particular the higher priority tasks are performed in accordance with their parameters.

A parameter may, as described above and below, be a timing parameter where the task is to be initiated after an earliest point in time, completed before a latest point in time and/or performed within a predetermined time interval, for example. In this context, the period of time required to perform each task may be estimated and taken into account.

In this situation, the order may be defined so that the higher priority tasks, if any, can be performed in accordance with their respective timing parameters. Any remaining tasks may then be added to the order either so that also they are performed in accordance with their timing parameters or with the knowledge or assumption that they cannot be completed within their timing parameters.

In addition, or alternatively, a consumption of a consumable, such as power, cleaning fluid, or waste space, may be taken into account as may any desired or required trips to a replenishment station for charging/refuelling and/or restocking of consumables. The trip to a replenishment station may in itself take time and require consumables, such as power.

Then, in the prioritization order, trips and a path to the replenishment station itself may be taken into account.

In one embodiment, step c) comprises an operator operating a user interface of a remote computer forwarding the information to the robot. The user interface may be adapted to any situation. The user interface may be a touch pad, touch screen, push button based, keyboard, voice recognition, gesture recognition or any other manner. The information may be a sequence of instructions for the robot to follow to navigate and optionally perform a task according to the sequence of instructions. The sequence of instructions may be entered and forwarded over time, during a period of time during which the robot performs the additional task. The robot may react immediately or as swiftly as possible to the individual instruction so that the robot is controlled in real time by the operator.

The remote computer may be any type of product, such as a mobile telephone, intelligent watch, pad, laptop, table top, stationary computer, mainframe, server or the like.

The remote computer may comprise further capabilities. The robot may communicate status information, such as its present state of consumables, distance/time to a replenishment station or the like, to give the operator more information before choosing.

The remote computer may, based on such state, determine one or more of the tasks or sequences between which the operator is to choose.

The computer or robot may base the order of the tasks or the selection of the tasks or sequences provided to the operator on a present state of the consumable(s) as well as an expected consumable expenditure of the tasks/sequences to be selected between, so that the robot is assumed to not run out of consumable(s) before reaching the end of a task/sequence or before reaching a replenishment station. The expected expenditure may be determined based on historic tasks. Often, tasks are repeated over time, whereby such knowledge or expected consumption may be determined.

As mentioned, steps c) and/or d) may comprise the operator engaging controlling elements of the robot. It is sometimes said that the robot is "kidnapped" when a robot, having controlling elements itself, is engaged by an operator and operated. Thus, the robot will discontinue the first task, when an operator engages the controlling elements of the robot and thereby orders it to perform another task.

The robot may have one or more controlling elements, such as handles, push buttons, steering wheel, pedals or the like, by which the operation of the robot may be controlled. It may be decided that the robot discontinues its present task, when a controlling element is engaged, and that the robot there after operates as instructed by the controlling elements. Some robots have a platform or a seat for an operator to rest on, such as for training purposes or for special purposes, such as one-time tasks which are not desirable to program into the robot. Once the controlling elements are disengaged, the robot may resume the first task, or the robot may communicate with the remote computer to obtain further instructions.

In one embodiment, between step d) and step):
  a present remaining amount is determined of one or more of the group consisting of: time, consumable, power and space,
  a predicted amount is determined of the one or more of the group consisting of: time, consumable, power and space required for performing the additional task, and
  an additional amount is determined of the one or more of the group consisting of: time, consumable, power and space required for performing the remaining tasks, and
  information is output relating to the remaining amount, the predicted amount and/or the additional amount.

In this connection, the additional task is the task which the operator instructs the robot to perform. It may not be easy to predict the time/consumable required for this task, as it may not be completely clear as to what this task entails. However, an expenditure in e.g., time or power may be estimated which is required to move to the first task on the re-ordered list. Also, the robot may compare the area in which it is operated to areas of other tasks or historic tasks and assume that the additional task will correspond to this other/historic task and predict the expenditure on that basis.

Thus, the "cost" or cost function of performing the additional task may be determined together with the cost of performing the remaining tasks. This "cost" may be a time consumption or an expenditure of power, waste space, space required for transporting goods, cleaning fluid or the like. Information is output representing or relating to the present remaining amount, the additional amount, and/or the predicted amount, such as for receipt by a remote computer. This may be for information only, as information has been received indicating the additional task. Alternatively, the robot may await an acceptance from an operator, such as via the remote computer, before discontinuing the first task.

In addition, step i) then could comprise determining the additional amount of the one or more of the group consisting of: time, consumable, power and space required for performing also any remaining tasks.

Then:
step g) may comprise determining a present amount of a consumable, such as a consumable used during operation and the performing of the task,
step h) may comprise determining a predicted amount of the consumable required for performing the additional task, and
step i) may comprise determining an additional amount of the consumable required for performing the remaining tasks.

Alternatively, or in addition:
step g) may comprise determining a present point in time,
step h) may comprise determining a predicted period of time required for performing the additional task, and
step i) may comprise determining an additional period of time required for performing the remaining tasks. The results of steps i) may be used in the determination of the order.

Alternatively, or additionally:
step h) may comprise determining a remaining period of time of a period of time allocated to perform the first task,
step i) may comprise determining a predicted amount of time required to perform the additional task,
step j) may comprise determining an additional amount of time required for the robot to perform a remaining tasks, and
step k) may comprise outputting information as to whether the remaining period of time exceeds a sum of the predicted amount of time and the additional period of time.

Thus, step k) outputs information as to whether there is time to perform the additional task within the limits given. The operator may then continue with the additional task, such as if a penalty of delayed finalizing of the first task is outweighed by a bonus for performing the additional task.

It is noted that each task may have to be performed within a predetermined time slot or outside of a time slot. A room may be booked for a time interval, so that operation of the robot may not be desired in that room within that time slot. Bookings may be made or deleted within short time frames, so that the tasks of the robot may alter during operation.

Then, when an additional task is to be performed, the tasks may need rearrangement or rescheduling in order to complete all tasks or as many tasks as possible within the respective time slot.

It may be preferred that, for each task, a parameter is a period of time within which the pertaining task must be performed, wherein:
step g) comprises determining a remaining period of time of a period of time allocated to perform the first task,
step g) comprises determining a predicted amount of time required to perform the additional task,
step i) comprises determining an additional amount of time required for the robot to perform all remaining tasks, and
step j) comprises outputting information as to whether the remaining period of time exceeds a sum of the predicted amount of time and the additional period of time.

Each remaining task, as well as optionally also the first task, may need to be finalized or preferably is finalized before a predetermined time of day. Thus, the remaining period of time may be a period of time from a present time of day to that time of day. There may, however, be time for much more than performing the remainder of the first task within that remaining period of time. The amount of time required to perform all remaining tasks of the service schedule is determined, as is a prediction of the period of time required to perform the additional task. The information output will relate to whether the remaining tasks, optionally the remainder of the first task, as well as the additional task may be finalized within the respective periods of time. If the remaining period of time exceeds the sum, the robot is estimated to be able to perform all tasks within the time allocated.

As mentioned, in one embodiment, for each task, a parameter is a point in time at which the pertaining task must be performed, wherein in step e):
a remaining period of time of a period of time required to perform the first task is determined, and
an order of the remaining tasks is determined wherein as many as possible of the remaining tasks, including the remainder of the first task, are completed within the points in time of each task, and
wherein step f) comprises performing the remaining tasks and the remainder of the first task in the determined order.

For some embodiments, some tasks are desired performed or finalized at, by or before some points in time and others at other points in time. In some embodiments, it is desired that one task has been finalized at one point in time (such as a time of day) and that another task is finalized before another point in time.

In addition, it may be desired to not start a task before another, earlier, point in time so that the task is desired performed within a time window.

Clearly, the carrying out of a task may be delayed, such as if the robot needs to travel a longer distance, needs to replenish a consumable or recharge, if the amount of goods to move is more than expected, if a surface to be cleaned is more dirty than expected, if the robot for some reason needs to move slower than expected, or the like. Another reason would be that the robot is required to perform the additional task. Thus, the robot may be in a situation where it is not able to perform all tasks within the respective time periods or points in time. Then, an order of the tasks may be determined in which as many of the tasks as possible are finalized within the respective points in time.

Alternatively, to having as many tasks as possible finalized within the respective points in time, a bonus system may be set up allocating a bonus to each individual task if finalized within the period of time. Bonuses for different tasks may be different. In that situation, the sum of the bonuses may instead be optimized so that perhaps fewer tasks are finalized according to the plan, but the combined bonus is optimal.

Naturally, multiple robots may be provided for carrying out the tasks. Thus, tasks may be reallocated from one robot to the other, if one robot is running late or if a robot is running out of a consumable, for example. Thus, the re-ordering may be performed across robots, to that not only the tasks of one robot are re-ordered but tasks are exchanged in order to finalize as many tasks within the parameters as possible or so as to obtain a combined bonus which is as high as possible.

Another aspect of the invention relates to a method of operating a robot in an area or venue, the method comprising:
 the robot performing a first task in a first portion of the area or venue,
 the robot determining that the first task should be discontinued,
 the robot selecting a second task to be performed in a second portion of the area or venue,
 the robot discontinuing the first task, moving to the second portion and performing the second task, and
 the robot reverting to the first portion, resuming the first task.

Naturally, all above and below aspects, embodiments, situations and considerations may be used in this aspect as well.

The tasks may be as described above and below. A task may be correlated to parameters thereof.

The robot may be as described above and below. The robot comprises means for performing the first and second tasks.

The robot may comprise one or more sensors for determining or identifying obstacles, such as persons, luggage, furniture, walls, stairs and the like. The robot may be configured to determine that the first task should be discontinued if a number of obstacles in the first portion exceed a threshold number or level or delay estimate.

Alternatively, the robot may comprise means for determining a portion, such as an area, of the task which may be performed. If this portion is lower than a threshold limit, the robot may decide to discontinue the task. In one situation, the first portion may comprise so many or so large obstacles that the portion of the floor which may be cleaned is below the threshold.

Alternatively, the robot may be able to estimate a period of time required to finalize the first task. If this period of time exceeds a threshold, the robot may decide to discontinue the task. In one situation, one or more obstacles may require the robot to move a larger distance, such as a distance beyond a threshold, to finalize the task. Then, the robot may discontinue the task.

Alternatively, the robot may comprise a sensor configured to determine a parameter of the first portion, such as surroundings of the robot. A parameter may be an air parameter, such as $CO_2$ indicating a number of persons in the portion. If the number of persons exceeds a threshold limit or if the $CO_2$ contents exceed a threshold limit, the robot may discontinue the first task. Another parameter may be a floor or surface parameter, such as whether fluid or dirt is present. A robot may discontinue the first task if fluid is detected on the surface such as on the floor. A vacuuming robot, for example, may be damaged or may not clean the floor sufficiently, if the floor is wet. Then, the robot may discontinue its operation in that area.

As mentioned above, information may be received from other systems, such as booking systems, ventilation systems or the like, from which e.g., occupation level can be estimated.

Alternatively, the robot may be configured to receive information from outside the robot, such as via a wireless connection. This information may bring the robot to discontinue its operation. This information may indicate to the robot that one of the above scenarios may occur in the near future, so that the robot may foresee this and discontinue the performing of the first task.

For example, a weather report indicating rain or bad weather may bring the robot to not clean a surface in the portion, if the portion is outside or inside but in an area wherein persons or vehicles will enter from outside.

If traffic information indicates that an increased number of persons or luggage or goods will soon arrive to the first portion, the robot may discontinue the first task and move away from the first portion.

The second portion may then be determined based also on the information or sensor output, or the second portion may be selected from a service schedule comprising a number of tasks to be performed.

The robot will revert to the first portion at a later point in time to resume the first task. When the robot reverts may depend on a number of factors. If the floor was wet, the robot may wait until it expects that the floor is again dry. If the weather report changes to the better, or if the traffic information again indicates less traffic, the robot could decide to resume the first task.

A third aspect of the invention relates to a method of operating a robot, the method comprising:
 providing an order of a plurality of tasks, each task having one or more corresponding parameters, such as one or more of the group consisting of: time, consumable, power and space,
 controlling the robot to perform a first of the tasks, the first task being performed while exceeding a first parameter of the first task, and
 re-prioritizing all remaining tasks, so that as many as possible of the tasks may be performed within the parameters of the remaining tasks.

Naturally, all above and below aspects, embodiments, situations and considerations may be used in this aspect as well.

The tasks may be as described above and below. A task may be correlated to parameters thereof.

The robot may be as described above and below. The robot comprises means for performing the tasks.

A fourth aspect of the invention relates to a system comprising a user interface and one or more robots configured to operate in an area or venue, wherein, and wherein a first robot is configured to:
 access a service schedule comprises information relating to a plurality of tasks, including a first task and, for each task, one or more parameters,
 perform the first task,
 receive information from the user interface when the user interface is operated by an operator,
 discontinue the first task and perform an additional task while the operator operates the user interface,
 after step d), determine, based on the parameters of any remaining tasks, an order of the remaining tasks and perform the remaining tasks in the determined order.

Naturally, all above and below aspects, embodiments, situations and considerations may be used in this aspect as well.

The tasks may be as described above and below. A task may be correlated to parameters thereof.

The robot may be as described above and below. The robot preferably comprises means for performing the first and additional tasks.

Several robots may be provided. Different robots may have different capabilities. Overlaps may exist so that one robot may take over a task originally assigned to another robot.

The system may comprise also an external controller, as will be described further below.

The robot may be configured to perform a task when comprising means configured to do so. Thus, as mentioned above, the robot may comprise drive means, propelling means, sensors, communication means, cleaning means, disinfecting means, monitoring means, storing means or the like.

The reception may be via receiving means, such as antennas, detectors, wires, or the like. The robot may comprise a controller for handling communication and interpreting received information.

The operation of the robot may be controlled by or controlled partly by a processor, which may be provided in the robot. This controller may comprise sensor output, such as when the robot is self-propelled. The controller may also hold information relating to the tasks, portions and so on.

The controller, or part thereof, may be provided externally to the robot, such as in the cloud or in a remote computer. The controller may operate using data, such as a service schedule, which may be provided in a memory close to the controller, such as in the robot, or remote from the processor, such as in the cloud or a remote computer. The controller may be any type of controller, such as a processor, controller, ASIC, DSP, FPGA, software controlled or hardwired. The controller may be monolithic, or multiple units may perform the operation. Part of the controlling, such as the determination, may be performed in the robot, in a nearby processor, such as if fog computing is used, or in a remote controller, such as if cloud computing is used. Any combination of such units may be used, and if multiple units are used, these units preferably are configured to communicate with each other. The above-mentioned storage may be provided in or at the controller and may be configured to communicate with the controller. The controller may be provided in the robot or outside of the robot.

The service schedule comprises information relating to a plurality of tasks, including the first task. Then, the robot is configured to perform the additional task which may not be on the service schedule. Then, a re-ordering or re-prioritization of the remaining tasks is performed. The remaining task may comprise a remainder of the first task.

As described above, in one embodiment, step e) comprises determining the order comprising also a remainder of the first task.

Further, the system may comprise a remote computer comprising a user interface and wherein step c) comprises an operator entering, into the user interface, information identifying the additional task, the remote computer being configured to forward the information relating to the additional task to the robot. As mentioned above, the user interface may be of any desired type and the remote computer may be of any type.

Kidnapping may be seen when the robot comprises controlling elements and wherein step c) comprises an operator engaging the controlling elements. In that situation, the robot may be configured to act in accordance with the instructions received from the controlling elements.

In general, the additional task is performed by the robot while the operator operates the user interface to control the operation of the robot.

As indicated above, in one embodiment, the system or robot further comprises a controller configured to, between step d) and step e):

determine a present remaining amount of one or more of the group consisting of: time, consumable, power and space, determine a predicted amount of the one or more of the group consisting of: time, consumable, power and space required for performing the additional task, and determine an additional amount of the one or more of the group consisting of: time, consumable, power and space required for performing the remaining tasks, and output information relating to the remaining amount, the predicted amount and/or the additional amount.

Then, step i) may comprise determining the additional amount of the one or more of the group consisting of: time, consumable, power and space required for performing also a remainder of the tasks.

This information may be output for an operator to accept the rescheduling before the tasks are initiated. Naturally, a number of tasks sequences may be presented to the operator to choose between. Also, the operator may be allowed to him/herself determine a sequence of the tasks.

Also, as indicated above, it may be desired that:

step g) comprises determining a present amount of a consumable, step h) comprises determining a predicted amount of the consumable required for performing the additional task, step i) comprises determining an additional amount of the consumable required for performing the remaining tasks.

Additionally, it may be desired that:

step g) comprises determining a remaining period of time of a period of time allocated to perform the first task, step h) comprises determining an additional amount of time required for the robot to perform a remaining tasks, and step i) comprises outputting information as to whether the remaining period of time exceeds a sum of the predicted amount of time and the additional period of time.

It may be desired that, for each task, a parameter is a period of time within which the pertaining task must be performed, wherein:

step g) comprises determining a remaining period of time of a period of time allocated to perform the first task, step h) comprises determining a predicted amount of time required to perform the additional task, step i) comprises determining an additional amount of time required for the robot to perform all remaining tasks, and step j) comprises the controller outputting information as to whether the remaining period of time exceeds a sum of the predicted amount of time and the additional period of time.

This is also described above in relation to the first aspect of the invention.

As mentioned, for each task, a parameter may be a point in time at which the pertaining task must be performed, wherein the controller is configured to:
- determine a remaining period of time of a period of time required to perform the first task,
- determine an order of the remaining tasks wherein as many of the remaining tasks, including the remainder of the first task, are completed within the points in time of each task,
- wherein step f) comprises controlling the robot to perform the remaining tasks and the remainder of the first task in the determined order.

In general, the processor may take the parameters into account and order or reorder the tasks in accordance with any system or parameter.

Another aspect of the invention relates to a robot configured to operate in an area or venue, the robot being configured to:
- a) perform a first task in a first portion of the area or venue,
- b) determine that the first task should be discontinued,
- c) select a second task to be performed in another portion of the area or venue,
- d) discontinue the first task, move to the second portion and perform the second task,
- e) revert to the first portion resuming the first task.

Naturally, all above and below aspects, embodiments, situations and considerations may be used in this aspect as well.

The tasks may be as described above and below. A task may be correlated to parameters thereof.

The robot may be as described above and below. The robot comprises means for performing the tasks.

As mentioned above, the decision may be based on sensors of the robot indicating different types of situations which the robot may be programmed to avoid, such as a too high population of the first portion or too many obstacles. A controller may be provided for receiving the sensor output and making the decision. The controller may determine the population or obstacles in a variety of manners and compare the density, number, or the like to a predetermined threshold. If the threshold is exceeded, the controller may determine the second task, redirect the robot to the second portion and to perform the second task.

The robot may additionally or alternatively comprise communication means configured to receive information from outside of the robot, such as via the internet, such as weather predictions, traffic predictions or the like. The robot may be configured to predict parameters of the first portion based on such information and determine whether to discontinue the first task based thereon.

A last aspect of the invention relates to a robot configured to:
- provide an order of a plurality of tasks, each task having one or more corresponding parameters, such as one or more from the group consisting of: time, consumable, power and space,
- perform a first of the tasks, the first task being performed while exceeding a first parameter of the first task
- re-prioritize all remaining tasks, so that as many as possible of the tasks may be performed within the parameters of the remaining tasks.

Naturally, all above and below aspects, embodiments, situations and considerations may be used in this aspect as well.

The tasks may be as described above and below. A task may be correlated to parameters thereof.

The robot may be as described above and below. As is elaborated on above, the robot comprises means for performing the tasks. Technologies related to the present invention may be found in the Applicants co-pending applications filed on even date and with the titles "A method of controlling a robot in relation to a service schedule" and "A method of operating a robot" which are incorporated herein by reference.

BRIEF DESCRIPTION OF THE DRAWINGS

In the following, preferred embodiments are described with reference to the drawing, wherein.

DETAILED DESCRIPTION

Figure 1:
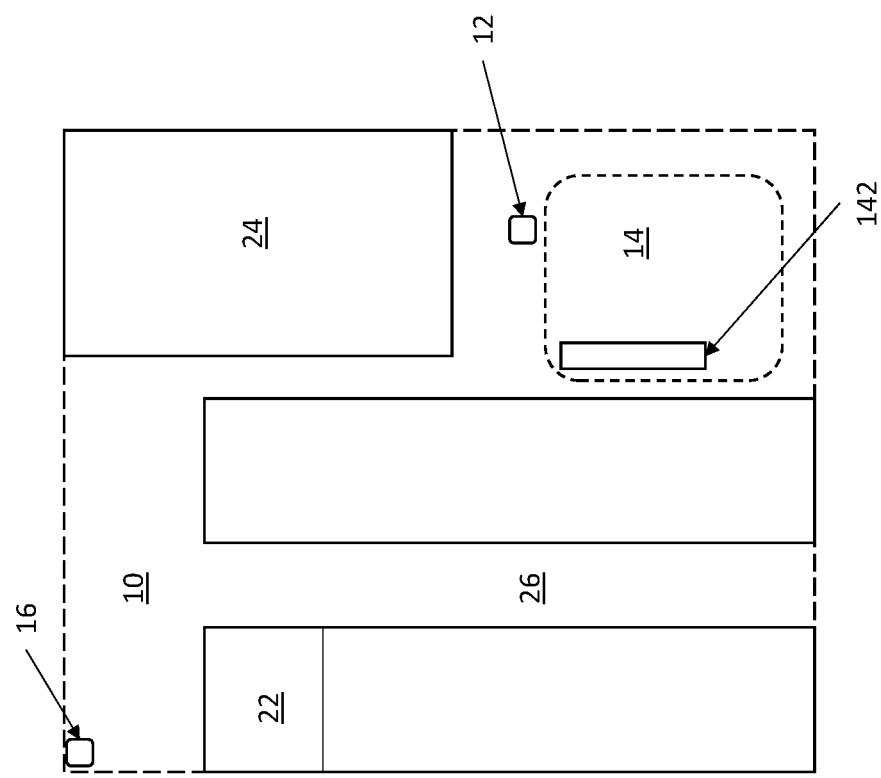
FIG. 1 illustrates a hotel in which a robot is working.

In FIG. 1, an example embodiment of a robot in its working space. In this example, the working space is a hotel 10 in which the robot 12 operates, such as for cleaning, disinfecting, delivering supplies or amenities and the like. The hotel has a reception desk 142 in a reception area 14 as well as a number of rooms 22, an aisle 26 and a grand ballroom 24.

The robot 12 may have fixed tasks such as the floor cleaning in the reception area 14 and the aisle 26 as well as, or alternatively, disinfecting walls, handrails, tablet ops, chairs and the like. The robot 12 may also or alternatively be called for to move supplies, such as fresh towels, from a central storage to local storages close to the rooms 22 or directly to the rooms. In addition, or alternatively, the robot may be called for to do specific tasks, such as bringing amenities, such as snacks, from the reception 142 or a bar/restaurant to an occupant of a room 22. Further alternatively, the robot may be configured to monitor or survey areas, such as shelves in supermarkets for empty spaces, cleanliness in areas (floors, horizontal surfaces, handrails and the like).

A replenishment station 16 is illustrated where the robot may be charged, may be added cleaning fluids, for example, and may have waste space, for example, emptied.

Figure 2:
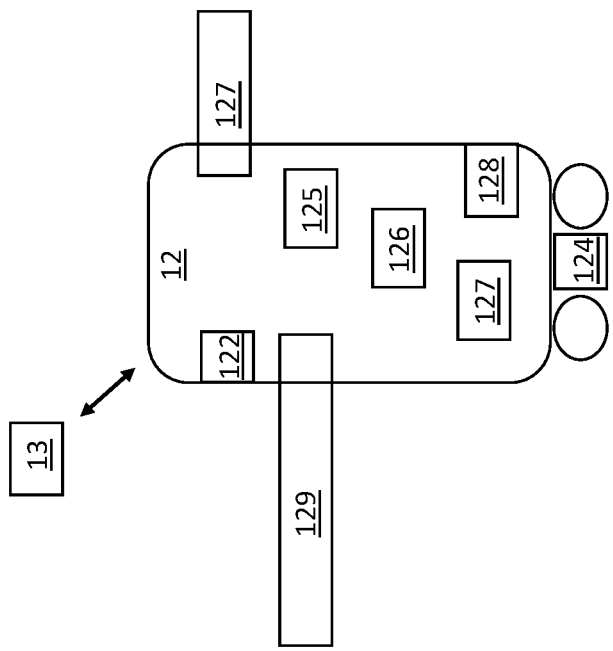
FIG. 2 illustrates a cleaning robot.

In FIG. 2, a robot 12 is seen having a controller 126, sensors 122 for detecting e.g., obstructions and other elements for navigating, a cleaning element 124 for, in this situation, cleaning floors, a sensor 128 for detecting the cleanliness of the cleaned floor and, optionally or additionally, an arm 129 comprising an irradiating element for irradiating surfaces, such as table tops, with radiation killing bacteria and viruses.

The cleaning schedule of the robot may comprise fixed tasks at fixed points in time or with fixed intervals, such as the vacuuming or washing of the floor in the reception area three times each day and in the aisle twice a day, where each room must be vacuumed once each day. Rooms are often vacated in the middle of the day, so that this is the preferred period of time for vacuuming the rooms. On the other hand, the aisle may be the busiest in the morning and late afternoon, so that it may be desired to not clean there in these time intervals.

The reception is the busiest in the morning for checking out and in the afternoon for the arrival of new guests. The reception may be very busy at particular other points in time, such as when the grand ballroom is rented for an event, such as a conference or a wedding. Outside of such events, the grand ballroom may be vacated for days, so that the cleaning thereof may be done in a less time critical manner. Cleaning of the reception area may be performed at night, as this would not disturb guests sleeping in the rooms.

Irrespective of the operation of the robot, a task may be required or desired performed within a prescribed period of time and/or with a predetermined maximum consumption of power, time, consumable or the like. Robots may be operated, rented, leased or sold under the agreement that the robot should be able to perform predetermined tasks under such limits.

A task may be a described or fixed action or activity, such as vacuuming, to be performed in a specified area, such as an aisle. A task may additionally be combined with one or more parameters. A task may have to be performed within a predetermined time interval, such as 8 minutes. A task may be initiated only after a predetermined point in time, such as 8 AM, or the task may have to be finalized before a predetermined point in time, such as LOAM. A task may have to be performed with a maximum consumption of a consumable, such as a predetermined amount of power, cleaning fluid or the like. The task may have to be performed with a maximum consumption of space, such as space for payload hauled or space for waste in a waste container of a cleaning robot.

A cleaning robot presently vacuuming an aisle 26 may be called to the reception area 14, if this area is excessively dirty due to many visitors or bad weather. Thus, the robot may discontinue its vacuuming in the aisle 26 and move to the reception area 14 in order to clean this area. Once done, the robot may revert to the aisle 26 and continue its vacuuming there.

Clearly, this situation of a hotel may be expanded or transferred to any other setting, such as an airport, a storage facility, a shop, a house, a building, a town, a city, a field or the like. Depending on the setting, the tasks of the robot may change. A delivery in a hotel may be towels, where in an airport it may be tax free goods for a store. In a storage facility or shop, it may be products or parcels, where in a town or city it may be any type of products, such as groceries, fast food, take-away or the like. In a field, a delivery may be fertilizer or weeding agents.

Irrespective of its capabilities, the robot may be requested to discontinue a current task to take up a new and perhaps more urgent task.

This, however, brings about a number of complications which should be taken into account before the robot continues to the new task.

A robot usually has a limited amount of resources required for its operation. Limited resources may be limited power, limited space for waste, limited space for cargo, limited maximum weight of cargo, limited time, limited supplies/consumables or the like.

Robots often are powered by a battery pack 125 which naturally will have a limited capacity. The power may be used for propelling the robot and potentially also for other operations of the robot, such as cleaning operations. Thus, interrupting a planned/present task to handle an urgent, additional task, may put the robot in a situation where, after the additional task, there is insufficient power remaining in the battery to handle the remainder of the planned task. The power consumption estimated for handling the additional task may be both that required by the actual, additional task as well as the robot's transport between the place of the current operation and the place of the additional task.

Robots may be cleansing robots which consume a consumable, such as liquid, cleansing agent or the like, present in a container 127, during its operation. Also, or alternatively, the operation of the robot may consume a space, such as a space for waste products from a cleansing action, such as dust from a vacuuming operation, liquid sucked from a floor washing operation, or the like. Such consumables and/or space often are limited, whereby also or alternatively this may be taken into account when an additional task is ordered.

Robots may be used for hauling or moving goods or cargo. Thus, a robot may be in the process of moving a number of items from a pick-up position to a delivery position, when the robot is requested to perform the additional task. In this situation, the storage space of the robot may be a limiting factor, if the additional task is a hauling/moving of additional goods. This robot may have to deliver its presently hauled goods, or part thereof, to a temporary storage in order to have space for the goods to be moved in the additional task. Thus, the calculation may take into account the moving to and delivery of the goods at the temporary storage and the later picking-up of that goods at the temporary storage—in addition to the moving to/from the position of the additional task and the performing of the additional task.

Further, the robot may be expected to finish its operation or a particular task within a predetermined period of time or before a predetermined time of day. Having to perform also the additional task may increase the overall period of time or delay the point in time where the robot has performed the particular task or all tasks.

In general, when the robot is requested to interrupt a current operation to handle an additional task, the robot or a system comprising the robot may calculate any expected extra consumption of time, power, space, consumable or the like. Then, information may be output relating to the increase in time, power and the like caused by the robot interrupting the current task, handling the additional task and reverting to and completing the current task.

Also, there may not be sufficient time, power, consumable, space or the like for the robot to both perform the additional task and revert to and complete the current task. A remaining consumable may be determined by a sensor, such as in relation to the container 127. Alternatively, the robot may require more time, more power, more consumable or the like than expected. Thus, agreed or set boundaries of time/power/consumables may have to be exceeded if the robot was to handle also the urgent, additional task.

When instructed to perform the additional task, the robot (or a controller remote therefrom) may review any remaining tasks thereof, such as in a service schedule listing the tasks for the robot as well as any parameters (expenditure of time, consumables and the like) to observe, and rearrange the remaining tasks to obtain the lowest possible violation of the parameters.

This information may be provided to an operator, so that the operator may accept the exceeded time/consumable/space/power expenditure resulting from accepting the additional, urgent task.

Naturally, the operation of the robot may be logged and compared to e.g., a Service Level Agreement defining the operations which the robot is to handle as well as, e.g., time periods in which the operations are to be performed, allowed or maximum expenditure of consumables, and the like. The SLA may also define penalties for not performing tasks, performing tasks outside of defined time periods, excessive use of consumables or the like.

On the other hand, the SLA may comprise a bonus for additional, urgent operations performed.

Then, requesting the robot to perform an additional task may bring the robot operation at odds with the SLA. The request may then be logged so that the reason for the violation of the SLA may be described. Also, the operator's acceptance of the exceeding of the time/power/consumable or the like may be logged and taken into account. Naturally, any bonuses for additional, urgent operations may also be logged.

This system clearly may be expanded to one having a number of robots. A number of operations may be defined for the robots and the robots may each be allocated to one or more such operations.

When an urgent, additional task is requested, the system may determine the above, required additional power/consumable/time or the like for a number of the robots and then determine or propose a robot for the additional task. This determination may be a determination of a robot having sufficient time/power/consumable or the like in order to be able to both perform the additional task and complete its other task(s). Clearly, if a robot is ordered to discontinue a task, that task or a subsequent task of that robot may be assigned to another robot, so that the robot selected for the additional task will have less tasks to perform when the additional task has been performed.

A parameter may be selected which is more relevant than others, when the robot for the additional task is to be identified. In one situation, it is desired to have the additional task performed as soon as possible so that the time-to-completion is of relevance. Thus, for the robots of the system, the time-to-completion may be determined and that with the earliest time-to-completion may be selected. Then, if that robot does not have sufficient time/consumables/energy or the like for its remaining tasks, other robots may be assigned to such tasks.

In another manner, the robots may be controlled so that an overall parameter is obtained, such as that the additional task is performed swiftly, but also so that all tasks are performed as closely as possible to the overall time (or for example the overall expenditure of consumable(s)) assigned or agreed-on for the tasks.

As mentioned, a bonus may be allocated for handling the additional task and penalties for not completing other tasks within the agreement. Thus, the operation of the robots may be calculated to obtain the most bonus or the lowest possible penalty. A net value may be optimized where the bonuses, penalties and cost of consumables are taken into account.

Clearly, the capabilities of the robots may be taken into account. Some robots may have a single capability, such as vacuuming, where other robots are configured to disinfect surfaces or hauling goods, and where others may have multiple capabilities, such as vacuuming and washing floors. Thus, when the additional task is identified, a robot capable of carrying out the additional task is identified, and any reallocation of the tasks of that robot may be made taking into account the nature of the tasks and the capabilities of the other robots.

Under all circumstances, the additional task may bring the robots to violate a SLA, as the additional task may exceed an allowed or agreed-on expenditure of time, consumables or the like. Then, the violation and the reason may be logged together with information as to the additional task and potentially an operator's agreement to the violation of the SLA.

The operation of the robot may be controlled by the controller 126 and/or an external controller 13, such as a remote computer. The operation may be divided so that the navigation and functions of the robot is handled by the controller 126 and so that the tasks/service schedule is provided by the remote computer 13. Then, the new tasks or next task may be downloaded from the controller 13. Also, the controller 13 may receive information on the additional task, perform the calculations on the added time, power, consumable or the like, which this will entail as well as, if desired, any added bonus or incurred penalty caused. An operator may then accept this "prize" for the performing of the additional task, after which corresponding instructions are fed to the robot.

In a particular example, the robot may further comprise operator engaging means 127 for a human operator to engage and control the robot. The robot may comprise a surface for an operator to stand on and handles for the operator to hold and for use to guide the robot. Thus, an operator may engage such means and thereby overrule the operation of the robot. This will also prevent the robot from performing the task at hand or the next task. The operation may then control the robot to perform e.g., an urgent task and may then release the robot for the robot to revert to the remaining tasks. The robot will then output information as to the operator's overriding as information relating to the task which the robot was prevented from performing. Clearly, alternatively, the robot may be remote controllable, whereby the overriding may again be determined and logged. In this manner, the robot may be autonomous so that no remote controller is needed.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

The invention claimed is:

1. A method of operating one or more robots in an area or venue, the method comprising:
   a) providing a service schedule representing a plurality of tasks, comprising a first task, and, for each task, one or more parameters,
   b) a first robot performing the first task,
   c) an operator engaging a user interface in communication with the robot,
   d) the first robot discontinuing the first task and performing an additional task while the operator operates the user interface, wherein step d) ends when the user disengages the user interface,
   e) after step d), determining, based on the parameters of any remaining tasks, an order of the remaining tasks and
   f) performing the remaining tasks in the determined order.

2. The method according to claim 1, wherein step e) comprises determining the order comprising also a remainder of the first task.

3. The method according to claim 1, wherein, between step d) and step e):
   g) a present remaining amount is determined of one or more of the group consisting of: time, consumable, power and space,
   h) a predicted amount is determined of the one or more of the group consisting of: time, consumable, power and space required for performing the additional task, and
   i) an additional amount is determined of the one or more of the group consisting of: time, a consumable resource, power and space required for performing the remaining tasks, and
   j) information is output relating to the remaining amount, the predicted amount and/or the additional amount.

4. The method according to claim 3, wherein step i) comprises determining the additional amount of the one or more of the group consisting of: time, consumable, power and space required for performing also a remainder of the first task.

5. The method according to claim 3, wherein step g) comprises determining a present amount of a consumable;
   wherein step h) comprises determining a predicted amount of the consumable required for performing the additional task; and
   wherein step i) comprises determining an additional amount of the consumable required for performing the remaining tasks.

6. The method according to claim 3, wherein step g) comprises determining a remaining period of time of a period of time allocated to perform the first task;
   wherein step h) comprises determining a predicted amount of time required to perform the additional task;
   wherein step i) comprises determining an additional amount of time required for the robot to perform the remaining tasks; and
   wherein step j) comprises outputting information as to whether the remaining period of time exceeds a sum of the predicted amount of time and the additional period of time.

7. The method according to claim 3, wherein, for each task, a parameter is a period of time within which a pertaining task must be performed;
   wherein step g) comprises determining a remaining period of time of a period of time allocated to perform the first task;
   wherein step h) comprises determining a predicted amount of time required to perform the additional task;
   wherein step i) comprises determining an additional amount of time required for the robot to perform all remaining tasks; and
   wherein step j) comprises outputting information as to whether the remaining period of time exceeds a sum of the predicted amount of time and the additional period of time.

8. The method according to claim 1, wherein, for each task, a parameter is a point in time at which a pertaining task must be performed, wherein in step e):
   a remaining period of time of a period of time required to perform the first task is determined,
   an order of the remaining tasks is determined wherein as many of the remaining tasks, including a remainder of the first task, are completed within the points in time of each task;
   wherein step f) comprises performing the remaining tasks and the remainder of the first task in the determined order.

9. A system comprising a user interface and one or more robots configured to operate in an area or venue, and wherein a first robot is configured to:
   a) access a service schedule comprising information relating to a plurality of tasks, including a first task and, for each task, one or more parameters,
   b) perform the first task,
   c) receive information from the user interface when the user interface is operated by an operator,
   d) discontinue the first task and perform an additional task while the operator operates the user interface, wherein step d) ends when the user stops engaging the user interface,
   e) after step d), determine, based on the parameters of any remaining tasks, an order of the remaining tasks and
   f) perform the remaining tasks in the determined order.

10. The system according to claim 9, wherein step e) comprises determining the order comprising also a remainder of the first task.

11. The system according to claim 9, further comprising a controller configured to, between step d) and step e):
- g) determine a present remaining amount of one or more of the group consisting of: time, consumable, power and space,
- h) determine a predicted amount of the one or more of the group consisting of: time, consumable, power and space required for performing the additional task, and
- i) determine an additional amount of the one or more of the group consisting of: time, consumable, power and space required for performing the remaining tasks, and
- j) output information relating to the remaining amount, the predicted amount and/or the additional amount.

12. The system according to claim 11, wherein step i) comprises determining the additional amount of the one or more of the group consisting of: time, consumable, power and space required for performing also a remainder of the tasks and/or that:
- step g) comprises determining a present amount of a consumable,
- step h) comprises determining a predicted amount of the consumable required for performing the additional task, and
- step i) comprises determining an additional amount of the consumable required for performing the remainder of the first task;

and/or that:
- step g) comprises determining a remaining period of time of a period of time allocated to perform the first task,
- step i) comprises determining an additional amount of time required for the robot to perform a remainder of the first task, and
- step j) comprises outputting information as to whether the remaining period of time exceeds a sum of the predicted amount of time and the additional period of time.

13. The system according to claim 11, wherein, for each task, a parameter is a period of time within which a pertaining task must be performed,
- wherein step g) comprises determining a remaining period of time of a period of time allocated to perform the first task;
- wherein step h) comprises determining a predicted amount of time required to perform the additional task;
- wherein step i) comprises determining an additional amount of time required for the robot to perform all remaining tasks, and
- wherein step j) comprises the controller outputting information as to whether the remaining period of time exceeds a sum of the predicted amount of time and the additional period of time.

14. The system according to claim 11, wherein, for each task, a parameter is a point in time at which a pertaining task must be performed, wherein the controller is configured to:
- determine a remaining period of time of a period of time required to perform the first task,
- determine an order of the remaining tasks wherein as many of the remaining tasks, including a remainder of the first task, are completed within the points in time of each task,
- wherein step f) comprises controlling the robot to perform the remaining tasks and the remainder of the first task in the determined order.

* * * * *